US011601284B2

(12) United States Patent
Priisalu et al.

(10) Patent No.: US 11,601,284 B2
(45) Date of Patent: Mar. 7, 2023

(54) DIGITAL SIGNATURE SYSTEM BASED ON A CLOUD OF DEDICATED LOCAL DEVICES

(71) Applicant: Planetway Corporation, San Jose, CA (US)

(72) Inventors: Jaan Priisalu, Tallinn (EE); Mart Saarepera, Tallinn (EE)

(73) Assignee: Planetway Corporation, San Jose, CA (US)

( * ) Notice: Subject to any disclaimer, the term of this patent is extended or adjusted under 35 U.S.C. 154(b) by 203 days.

(21) Appl. No.: 16/442,141

(22) Filed: Jun. 14, 2019

(65) Prior Publication Data
US 2020/0396085 A1    Dec. 17, 2020

(51) Int. Cl.
*H04L 9/32* (2006.01)
*H04L 9/00* (2022.01)

(52) U.S. Cl.
CPC ............ *H04L 9/3247* (2013.01); *H04L 9/002* (2013.01)

(58) Field of Classification Search
CPC ..... H04L 9/3247; H04L 9/002; H04L 9/3236; H04L 9/32
USPC ......................................................... 713/176
See application file for complete search history.

(56) References Cited

U.S. PATENT DOCUMENTS

| | | | | |
|---|---|---|---|---|
| 7,496,759 | B2 * | 2/2009 | Komano | ............... H04L 9/3249 713/168 |
| 8,578,169 | B2 * | 11/2013 | Adams | ................... H04L 63/123 713/181 |
| 9,641,341 | B2 * | 5/2017 | Oberheide | .............. H04L 63/10 |
| 10,511,445 | B1 * | 12/2019 | Rubin | ................... H04L 9/3247 |
| 2002/0186838 | A1 * | 12/2002 | Brandys | ................ H04L 9/3263 713/185 |
| 2003/0110383 | A1 * | 6/2003 | Garay | ................... H04L 9/3247 713/176 |

(Continued)

FOREIGN PATENT DOCUMENTS

WO      2018073685 A1     4/2018

OTHER PUBLICATIONS

Bellare, M., Sandhu, R.: The Security of Practical Two-Party RSA Signature Schemes. Cryptology e-print archive 2001/060.

(Continued)

*Primary Examiner* — Kambiz Zand
*Assistant Examiner* — Mahabub S Ahmed
(74) *Attorney, Agent, or Firm* — McDonald Hopkins LLC; James P. Muraff (57) ABSTRACT

Method and apparatus are disclosed for attack tolerant implementations of public key digital signatures based on a cloud of dedicated local devices. A system includes a first security device, a second security device, and a computing device remote from the first and second security devices. The first security device stores a first private key and, in response to receiving a message, generates a first signature based on a message received from the computing device and the first private key. The second security device stores a second private key that is independent from the first private key and, in response to receiving a message, generates a second signature based on a message received from the computing device and the first private key. The computing device generates a composite cryptographic signature based on the first signature and the second signature.

15 Claims, 6 Drawing Sheets

(56) References Cited

U.S. PATENT DOCUMENTS

| | | | |
|---|---|---|---|
| 2004/0221158 A1* | 11/2004 | Olkin | H04L 9/3247 713/170 |
| 2005/0262353 A1* | 11/2005 | Gentry | H04L 9/3247 713/176 |
| 2007/0157028 A1* | 7/2007 | Lott | G06F 21/31 713/182 |
| 2008/0005570 A1* | 1/2008 | Johnson | H04L 9/3252 713/176 |
| 2008/0229104 A1* | 9/2008 | Ju | H04L 9/3268 713/169 |
| 2009/0044017 A1* | 2/2009 | Teranishi | H04L 9/3249 713/176 |
| 2009/0106560 A1* | 4/2009 | Chopart | G06F 21/64 713/189 |
| 2009/0271631 A1* | 10/2009 | Teranishi | H04L 9/3247 713/176 |
| 2010/0174909 A1* | 7/2010 | Ashdown | H04L 9/14 713/181 |
| 2011/0060903 A1* | 3/2011 | Yoshida | H04L 9/3218 713/155 |
| 2011/0213982 A1* | 9/2011 | Brown | H04L 9/3252 713/176 |
| 2011/0258455 A1* | 10/2011 | Johnson | H04L 9/3252 713/176 |
| 2012/0198228 A1* | 8/2012 | Oberheide | H04L 63/126 713/155 |
| 2013/0159730 A1* | 6/2013 | Asim | H04L 9/3255 713/189 |
| 2013/0166914 A1* | 6/2013 | Vandervort | H04L 63/123 713/176 |
| 2014/0164765 A1* | 6/2014 | Hernandez | H04L 9/3255 713/156 |
| 2014/0173281 A1* | 6/2014 | Hwang | H04L 9/3255 713/171 |
| 2014/0289528 A1* | 9/2014 | Baghdasaryan | H04L 9/3297 713/171 |
| 2016/0191473 A1* | 6/2016 | De Wasch | H04L 9/3247 713/176 |
| 2017/0141924 A1* | 5/2017 | Ryu | H04L 9/3236 |
| 2017/0339118 A1* | 11/2017 | Hwang | H04L 9/0844 |
| 2018/0097783 A1* | 4/2018 | Haldenby | H04L 9/14 |
| 2018/0144233 A1* | 5/2018 | Chen | G06K 19/06009 |
| 2019/0007215 A1* | 1/2019 | Hakuta | H04W 12/069 |
| 2019/0089547 A1* | 3/2019 | Simplicio, Jr. | H04L 63/108 |
| 2019/0141533 A1* | 5/2019 | Kang | H04W 12/0471 |
| 2019/0207758 A1* | 7/2019 | Cambou | H04L 9/0866 |
| 2019/0245682 A1* | 8/2019 | Alwen | H04L 63/0428 |
| 2019/0253242 A1* | 8/2019 | Mac Brough | H04L 9/3239 |
| 2019/0295050 A1* | 9/2019 | Chalkias | G06Q 20/3827 |
| 2019/0319798 A1* | 10/2019 | Chalkias | H04L 9/3239 |
| 2019/0372763 A1* | 12/2019 | Yang | H04L 9/008 |
| 2020/0044861 A1* | 2/2020 | Buldas | H04L 9/085 |
| 2020/0092107 A1* | 3/2020 | Cole | G06F 21/6245 |
| 2020/0250676 A1* | 8/2020 | Sierra | H04L 9/0637 |
| 2020/0322175 A1* | 10/2020 | Chen | H04L 9/3066 |
| 2020/0344070 A1* | 10/2020 | Li | H04L 9/0825 |
| 2020/0344074 A1* | 10/2020 | Främling | H04L 9/3268 |
| 2020/0358604 A1* | 11/2020 | Choi | H04L 9/50 |
| 2020/0358622 A1* | 11/2020 | Yoshida | H04L 9/0869 |

OTHER PUBLICATIONS

Buldas, A., Kalu, A., Laud, P., Oruaas, M.: Server-Supported RSA Signatures for Mobile Devices. In: Foley, S. N., Goiimann, D., Snekkenes, E. (Eds.): ESORICS 2017, Part I, LNCS 10492, pp. 1-19 (2017).

Boneh, D., Franklin, M.K.: Efficient Generation of Shared RSA Keys. In: Kaliski Jr., B.S. (Ed.): CRYPTO 1997, LNCS 1294, pp. 425-439 (1997).

Boneh, D., Franklin, M.K.: Efficient Generation of Shared RSA Keys. J. ACM 48(4), 702-722 (2001).

Boneh, D., Horwitz, J.: Generating a Product of Three Primes With an Unknown Factorization. In: Buhler, J.P. (Ed.): ANTS 1998, LNCS 1423, pp. 237-251 (1998).

Camenisch, J., Lehmann, A., Neven, G., Samelin, K.: Vinual Smart Cards: How to Sign With a Password and a Server, In: Zikas, V., De Priso, R. (Eds): SCN 2016, LNCS 9841; pp. 353-371 (2016).

Damgård, I.B., Koprowski, M.: Practical Threshold RSA Signatures Without a Trusted Dealer. In: Pfitzmann, B. (Ed.) Eurocrypt 2001, LNCS 2045, pp. 152-165 (2001).

Damgård, I., Mikkelsen, G.L.: on the Theory and Practice of Personal Digital Signatures. In: Jarecki, S., Tsudik, G. (Eds.): PKC 2009, LNCS 5443, pp. 277-296 (2009).

Damgård, I., Mikkelsen, G.L.: Efficient, Robust and Constant-Round Distributed RSA Key Generation. In: Micciancio, D. (Ed.): TCC 2010, LNCS 5978, pp. 183-200 (2010).

Damgård, I., Mikkelsen, G.L., Skeltved, T.: On the Security of Distributed Multiprime RSA. In: Lee, J., Kim, J. (Eds.): ICISC 2014, LNCS 8949, pp. 18-33 (2015).

Desmedt, Y.: Society and Group Oriented Crytopgraphy: a New Concept. In: Pomerance, C. (Ed.): CRYPT0'87, LNCS 293, pp. 120-127 (1988).

Desmedt, Y., Fraenkel, Y.: Threshold Cryptosystems. In: Brassard, G. (Ed.): CRYPTO'8 9, LNCS 435, pp. 307-315 (1990).

Frankel, Y., Mackenzie, P.D., Yung. M.: Robust Efficient Distributed RSA Key Generation. In: Vitter, J.S. (Ed.): STOC, pp. 663-672. ACM (1998).

Gennaro, R., Jarecki, S., Krawczyk, H., Rabin, T.: Robust and Efficient Sharing of RSA Functions. J. of Cryptology 13, 273-300 (2000).

Gilboa, N.: Two Party RSA Key Generation. In: Wiener, M. (Ed.): CRYPTO 1999, LNCS 1666, pp. 116-129 (1999).

Hazay, C., Mikkelsen, G.L., Rabin, T., Toft, T.: Efficient RSA Key Generation and Threshold Paillier in the Two-Party Setting. In: Dunkelman, O.(Ed.): CT-RSA 2012, LNCS 7178, pp. 313-331 (2012).

Kwon, T.: On the Difficulty of Protecting Private Keys in Software. In: Chan, A.H., Giigor, V. (Eds.): ISC 2002, LNCS 2433, pp. 17-31 (2002).

Kwon, T.: Robust Software Tokens—Yet Another Method for Securing User's Digital Identity. In: Safavi-Naini, R., Seberry, J. (Eds.): ACISP 2003, LNCS 2727, pp. 476-487 (2003).

Mackenzie, P., Reiter, M.K.: Networked Cryptographic Devices Resilient to Capture. Int. J. of information Security 2 (1), 1-20 (2003).

Rivest, R., Shamir, A., Adleman, L.: A Method for Obtaining Digital Signatures and Public-Key Cryptosystems. Communications of the ACM 21 (2): 120-126 (1978).

Shoup, V.: Practical Threshold Signatures. In: Preneel. B. (Ed.): EUROCRYPT 2000, LNCS 1807. pp. 207-220 (2000).

European Office Action dated Nov. 30, 2021; European Patent Application No. 20161308.0.

\* cited by examiner

DIGITAL SIGNATURE SYSTEM BASED ON A CLOUD OF DEDICATED LOCAL DEVICES

TECHNICAL FIELD

The present disclosure generally relates to secure electronic communication and electronic commerce and, more specifically, attack tolerant implementations of public key digital signatures based on a cloud of dedicated local devices.

BACKGROUND

Increasingly, documents are being signed digitally. Digital signatures employ systems that (a) authenticates a person signing the document is who they say they are when they sign and (b) validates that a signed document is authentic. In this manner, a person who is relying on the document can be certain that the document is authentic and the person who signed the document cannot deny that they signed it. These digital signature systems often use asymmetric cryptography which rely on a secret private key and a non-secret public key associated with an individual. To forge a signature, a malicious actor needs to obtain the secret key or spend the computational cost (if possible) of breaking the signature scheme (i.e. signing a message without having the private key). Attack tolerance to a digital signature system can be classified into mathematical tolerance (e.g., the ability to forge a digital signature by breaking the signature mathematically) or physical tolerance (e.g., tampering with a physical device to forge a signature). Generally, it is harder to improve physical tolerance.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

An example system for generating a digital signature includes a first security device, a second security device, and a computing device remote from the first and second security devices. The first security device stores a first private key, and in response to receiving a message, generates a first signature based on a message received from the computing device and the first private key. The second security device stores a second private key that was independently generated from the first private key and, in response to receiving the message, generates a second signature based on the message and the second private key. The computing device, in response to receiving a request for the digital signature, sends the message to the first security device and the second security device. The computing device also, in responses to receiving the first signature and the second signature, generates a composite cryptographic signature based on the first signature and the second signature. Additionally, the computing device appends the composite cryptographic signature to a digital document.

In some example embodiments, the first security device, before generating the first signature, authenticates the signer based on a first input to the first security device. Additionally, the second security device, before generating the second signature, authenticates the signer based on a second input to the second security device.

In some example embodiments, the first input is a different type of input than the second input In some example embodiments, the first security device generates the first private key and a first public key including a first public modulus. The second security device generates the second private key and a second public key including a second public modulus.

In some example embodiments, the computing device generates the composite cryptographic signature further based on the first public module and the second public modulus.

In some example embodiments, the computing device does not store a private key used to generate the composite cryptographic signature.

In some example embodiments, the first security device and the second security device each are communicatively coupled to the computing device.

In some example embodiments, the first security device is communicatively coupled to the computer device, and the second security device is communicatively coupled to the first security device.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Figure 1A:
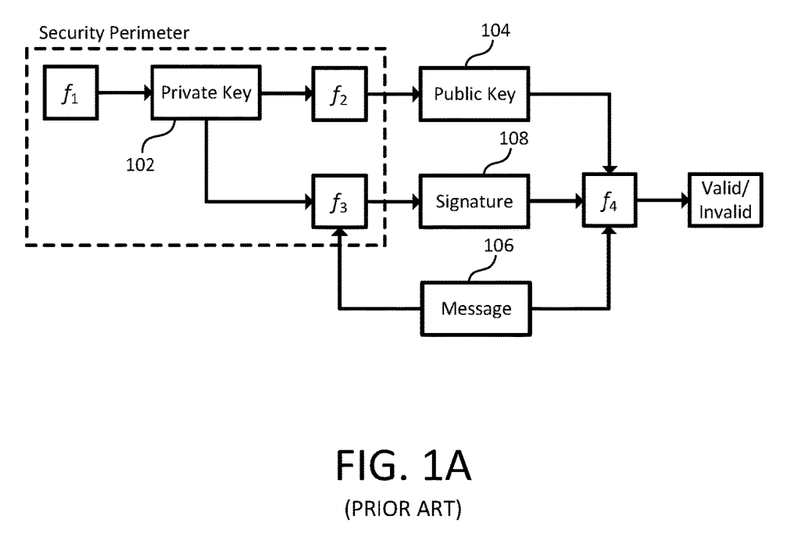
FIG. 1A illustrates a system that employs traditional asymmetric cryptography using a single private key.

A common asymmetric cryptography system (sometimes referred to as a "public key cryptosystem") used for digital signatures is Rivest-Shamir-Adleman (RSA). As illustrated in FIG. 1A, the RSA cryptosystem uses four functions. The first function is a Private Key Generation function ($f_1$), which generates a private key 102 based on two distinct prime numbers p and q. The integers p and q are randomly chosen and are kept secret. The second function is a Public Key Generation function ($f_2$) which generates a public key 104 based on the two prime numbers p and q. The public key 104 consists of a public modulus (n) and a public exponent (e). The public modulus (n) is calculated in accordance with Equation 1 below. The public exponent (e) is selected such that Equation 2 below is true.

$$n = pq \qquad \text{Equation 1}$$

$$\gcd(p-1,e) = \gcd(q-1,e) \qquad \text{Equation 2}$$

In equation 2 above, gcd is the greatest common divisor function that returns the largest positive integer that divides each of the inputs. The RSA cryptosystem uses a third function ($f_3$) to sign a message (m) 106 with the private key 102, where $m \in \mathbb{Z}_n = \{0, \ldots, n-1\}$. The RSA cryptosystem uses a private exponent (d) to calculate the signature 108 of the message (m) 106. The private exponent (d) is calculated in accordance with Equation 3 below.

$$d = \frac{1}{e} \bmod (p-1)(q-1) \qquad \text{Equation 3}$$

The signature 108 of the message (m) 106 is σ(m), which is calculated in accordance with Equation 4 below.

$$\sigma(m) = m^d \bmod n \qquad \text{Equation 4}$$

To verified a received signature (σ) 108 and an accompanying message (m) 106, the RSA cryptosystem uses a fourth function ($f_4$) based on the public modulus (n) and the public exponent (e). The signature (θ) 108 is verified when Equation 5 below is true.

$$\sigma^e \bmod n = m \qquad \text{Equation 5}$$

Secure implementation of a signature scheme based on RSA requires that a signer (e.g., a person or group of persons) has sole control of functions $f_1$, $f_2$, and $\theta_3$ within a security parimeter. Typically, a device implementing the RSA signature scheme: (a) executes $f_1$ and $f_2$ only once in a lifetime of the device; and (b) assures that only the authorized signer can execute function $f_3$. The private key (e.g., the private key 102) must never leave the device. The device must always be capable of reliably authenticating the signer before executing $f_3$. Thus, the security device requires, within the security perimeter, (a) computational power to computer the functions, (b) memory to store the keys, (c) input/output (I/O) devices, and (d) an authentication solution. The security perimeter may consist of separate electronics that each implement a partial functionality. For example, the key generating functions $f_1$ and $f_2$ may be implemented by one set of electronics, and the signing function $f_3$ may be implemented is a separate set of electronics.

The cryptographic attack tolerance of a signature scheme (such as the RSA cryptosystem described above) is defined in terms of computational complexity theory and has mathematical and physical components. The measure of mathematical attack tolerance takes into account the computational resources (number of steps, memory in bits, program size, etc.) that is necessary to break the scheme (i.e., sign a message without having access to the private key). The computational cost of breaking the scheme is expressed as a security level. The security level is usually expressed in "bits." "N-bit security" means that the malicious actor would have to perform $2^N$ operations to break the scheme. For example, a signing scheme may have 128-bit or 256-bit security. The monetary cost of breaking the scheme is considered proportional with the computational cost. Physical attack tolerance of a security device refers to the cost of forging a signature without breaking the signature scheme mathematically (e.g., tampering with the security device).

The mathematical and physical attack tolerance required for a signing scheme are derived from risk analysis and takes into account the application in which the signature solution is being used. Often, the physical design of security devices are a weakness in an RSA-based signing scheme. One approach to increasing physical attack tolerance is to require cooperation between multiple devices. In such an approach, a signature key (e.g., a master private key) is shared between several security devices. As such, a signature can only be created when the security devices cooperate. Attacking one device (e.g., physically tampering with one device, uncovering the portion of the master private key on one device, etc.) is insufficient to forge signatures.

Figure 1B:
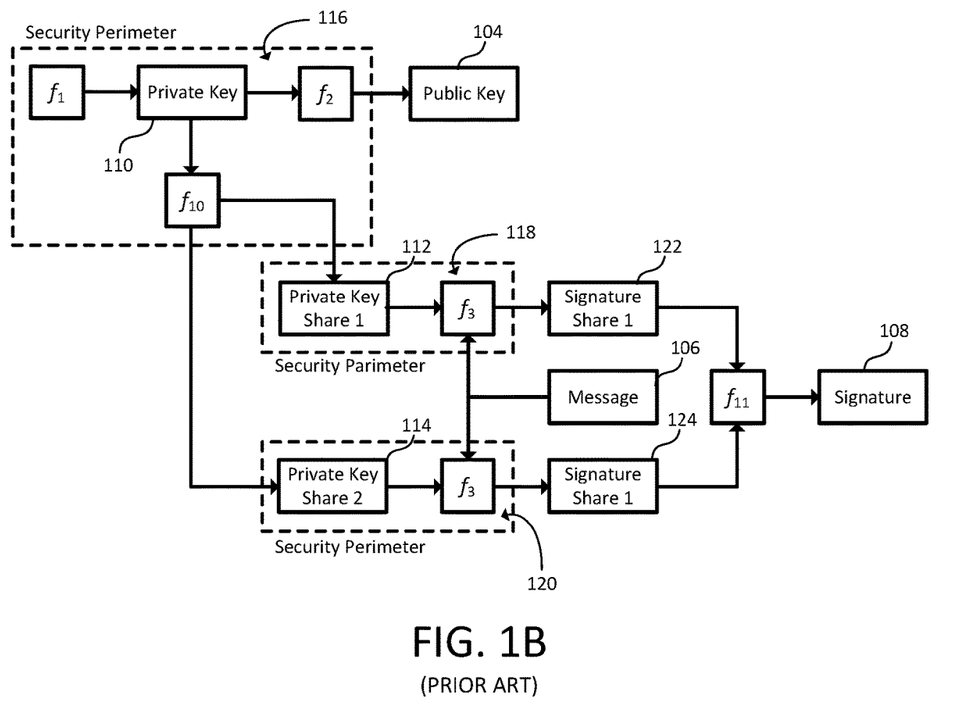
FIG. 1B illustrates a system that employs split-key asymmetric cryptography that uses multiple private key shares are that dependent on a single private key.

One such approach is illustrated in FIG. 1B. In FIG. 1B, a master private key 110 is split into two private key shares 112 and 114 (sometimes referred to as a Split-Key signing scheme). The master private key 110 is generated by a trusted dealer 116 who splits the master private key 110 with function $f_{10}$ to create a first private key share (d') 112 and a second private key share (d") 114. The trusted dealer 116 may split the master private key 110 for additive sharing or for multiplicative sharing. FIG. 1B illustrates the trusted dealer 116 splitting the master private key 110 for additive sharing. When splitting for additive sharing, the trusted dealer 116 uses $f_{10}$ to derive the first private key share (d') 112 and the second private key share (d") 114 based on the private exponent (d) of the master private key 110 in accordance to Equation 6 below.

$$d \equiv d' + d'' (\bmod \varphi(n)) \qquad \text{Equation 6}$$

When splitting for multiplicative sharing, the trusted dealer 116 uses $f_{10}$ to derive the first private key share (d') 112 and the second private key share (d") 114 in accordance to Equation 7 below.

$$d \equiv d'd'' (\bmod \varphi(n)) \qquad \text{Equation 7}$$

The trusted dealer 116 transmits the first private key share (d') 112 to a first security device 118 and the second private key share (d") to a second security device 120. When generating a signature, the security devices 118 and 120 perform function $f_3$ with their respective private key shares to generate a first signature share (σ') 122 and a second signature share (σ") 124. The signature (σ) 108 is generated with the first signature share (a' 122 and the second signature share (σ") 124 with function $f_{11}$. For additive sharing, function $f_{11}$ is calculated in accordance with Equation 8 below.

$$\sigma = \sigma' \cdot \sigma'' \bmod n = m^{d'+d''} \bmod n \qquad \text{Equation 8}$$

For multiplicative sharing, function $f_{11}$ is calculated in accordance with Equation 9 below.

$$\sigma = \sigma''(\sigma'(m)) = m^{d'd''} \bmod n \qquad \text{Equation 9}$$

The generated signature 108 is used as describe above with the traditional RSA signing scheme.

In some examples, one of the private key shares is held by a mobile device (e.g., a smartphone) and the other private key share is held by a server cooperating in the signing scheme. The Split-Key signing scheme often requires a trusted dealer to split a master private key 110 into the signature shares 112 and 114 and then securely transmitting the signature shares 112 and 114 to the security devices. This introduces a third party. However, parties that act as the trusted dealer may be, in some circumstances, untrustworthy dealers that abuse their power to forge users' signatures. Additionally, trusted dealers become a single point of failure in the signing scheme. If a trusted dealer is compromised, all the master private keys it holds or generates are also compromised. To overcome this shortcoming, the distributed generation of shares is used, where the first signature share (σ') 122 and the second signature share (σ'') 124 and the common public key 104 are generated as the outcome of a multi-party cryptographic protocol (e.g., the multi-party cryptographic protocol Π) in which the master private key 110 never exists as a whole. However, Split Key implementations are very costly and inefficient compared the conventional RSA implementations.

As described in more detail below, signature generation using cooperation between multiple devices can be implemented with a physical attack tolerance greater than the conventional RSA signer scheme without the computational inefficiency of a Split Key signing scheme (e.g., with the multi-party cryptographic protocol) or the issues surrounding using a trusted dealer. In the system described below, instead of generating a set of signature shares dependent on either a master private key or a multi-party cryptographic protocol, a composite signature can be composed from individually generated signatures that are based on independently generated private keys. This is sometimes referred to as a Comp Key scheme. As used herein, an independently generated private key is a private key that was not generated using any master private key or multi-party cryptographic protocol (e.g., as opposed to the private key shares of the Split Key signing scheme).

The system includes two or more security devices each storing an independently generated private key that is associated with its own public key. The security devices may be any portable electronic device that is capable of (a) securely storing the independently generated private key, (b) receiving an input from a signer, (c) reliably authenticating the identity of the signer based on that input, (d) receiving a message to generate a signature, (e) generating the signature with the independently generated private key and the message, and (f) transmitting the signature to a computing device (e.g., a server, etc.) requesting the signature. In some examples, the security devices may be smartphones, smart watches, tablet computers, jewelry with embedded electronics (e.g., bracelets, rings, broaches, etc.), smart cards (e.g., a credit card, an identification card, etc.), and/or an electronic hanko, etc. In some examples, each security device is configured to physically receive an input (e.g., a biometric identifier such as a fingerprint, a password, etc.) from the signer independently from any other security device. In some examples, each security device communicates with computing device (e.g., via a wireless connection to the Internet, etc.). Alternatively, in some examples, one of the security devices acts as a primary device that communicates with the computing device (e.g., via a wireless connection to the Internet, etc.) while other security devices communicate with the primary device via a local area network (e.g., a wireless local area network, a Bluetooth® Low Energy connection, etc.) to communicate with the computing device.

The computing device receives the signatures from the security devices. The computing device generates a composite signature and then uses the composite signature to sign a digital document (e.g., a contract, an acceptance of a website's terms of service, a legal document, etc.). To verify a previously signed document, the computing device retrieves the public keys associated with the security devices and generates a composite public key. Using the composite public key, the computing device verifies whether the signature on a digital document is authentic.

Increasing physical attack resistance is more difficult than increasing mathematical attack resistance. There is a need for signing schemes that have an increased physical attack tolerance. Currently approaches do not increase physical attach resistance. While a Comp Key signing scheme has a lower mathematical resistance than the corresponding conventional RSA signing scheme (e.g., if an RSA implementation has a k-bit public modulus (n) and l-bit security, the composite signature will have a bit security less than l despite having a 2 k-bit public modulus), the composite signature is only compromised through a physical attack if all of the security devices used to generate that composite signature are compromised. The mathematical attack resistance of the Comp Key signing scheme can be increased by increasing the bit length of the public modulus (n) (e.g., a 256-bit public modulus (n), a 2048-bit public modulus (n), etc.). Using the system described below that employs at least two security devices with independently generated private keys, the physical attack resistance of the signing scheme increases.

Figure 2:
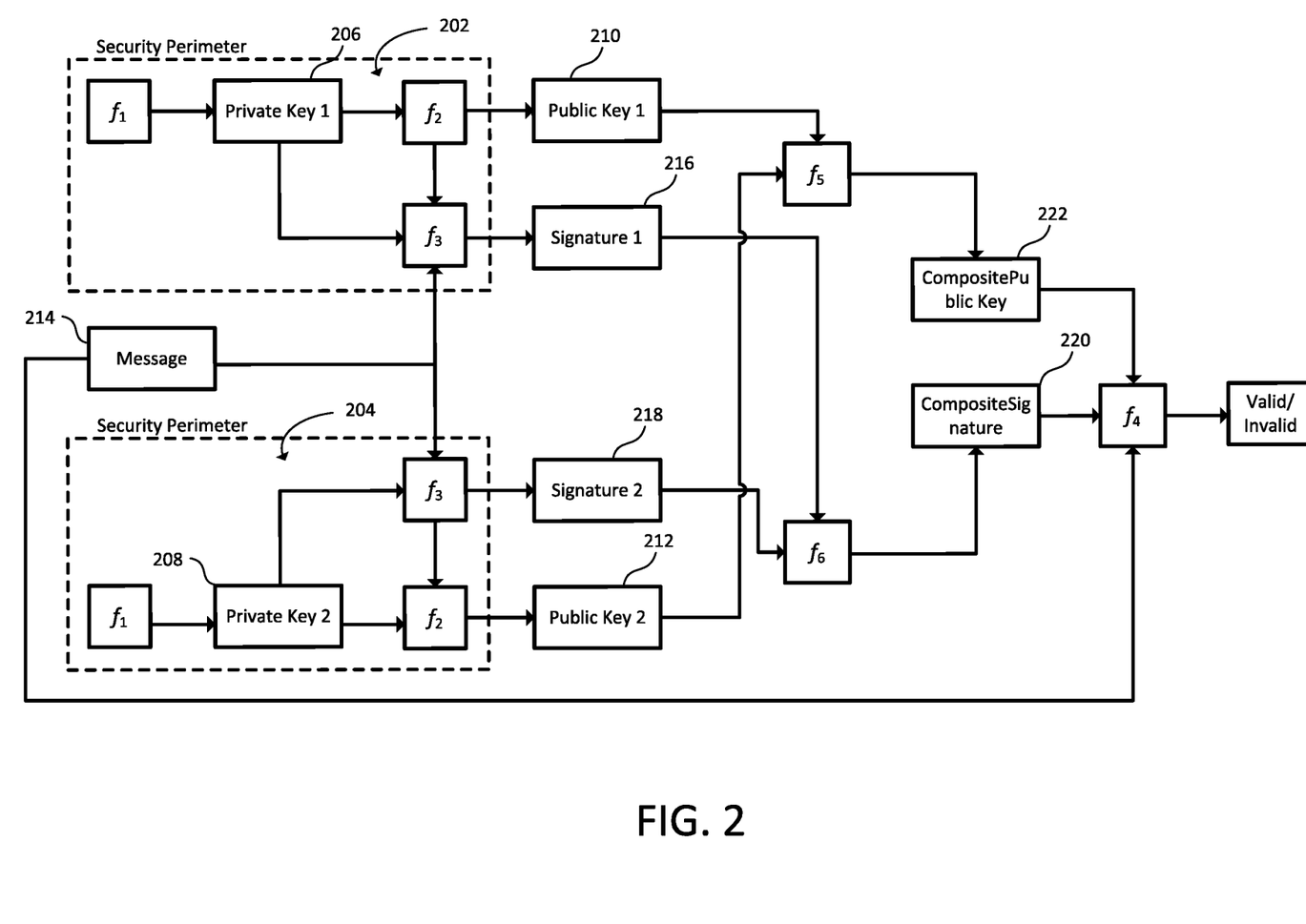
FIG. 2 illustrates a system that employs composite-key key asymmetric cryptography that uses multiple private keys that are independent of each other.
Figure 3:
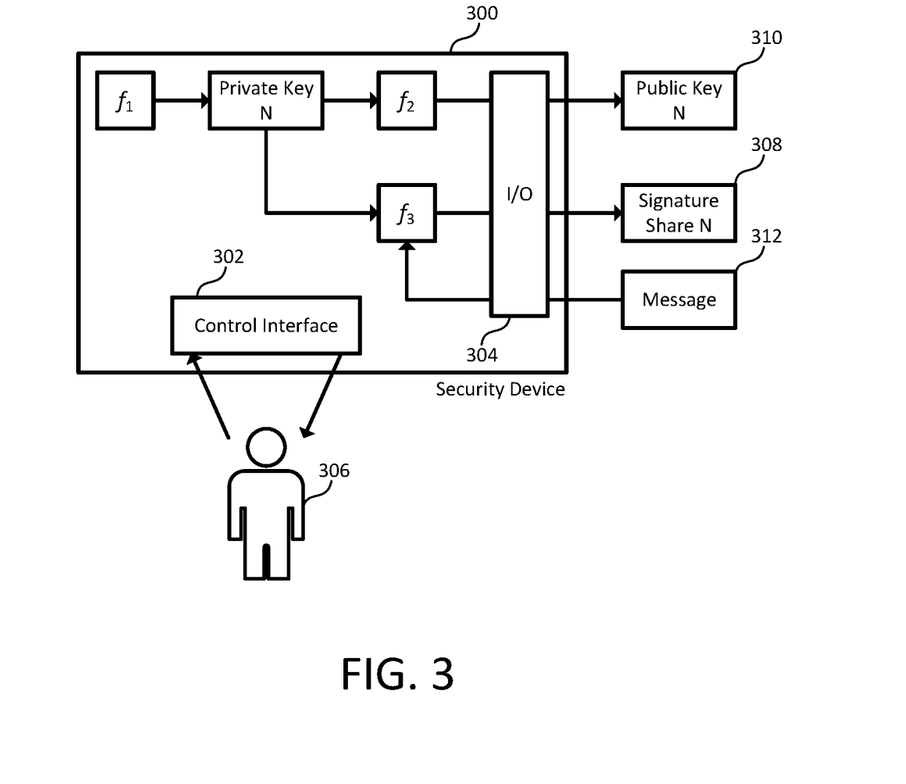
FIG. 3 illustrates a secure device implementing a device-side portion of the composite-key asymmetric cryptography of FIG. 2.
Figure 4:
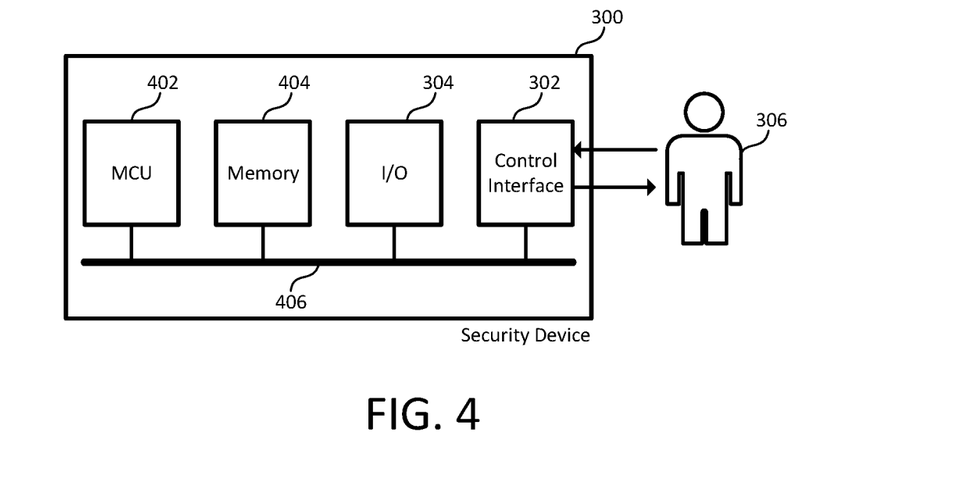
FIG. 4 is a block diagram of electronic components of the secure device of FIG. 3.

FIG. 2 illustrates a system that employs composite-key key asymmetric cryptography that uses multiple private keys that are independent of each other. FIG. 2 illustrates a Comp Key signing scheme using a first security device 202 and a second security device 204 (e.g., security devices 300 as shown in FIGS. 3 and 4 below). The security devices 202 and 204 each independently generate a private key 206 and 208 using function $f$ (as described above). Additionally, the security devices 202 and 204 each generate a public key 210 and 210 with a public modulus (n) (e.g., calculated in accordance with Equation 1 above) and a public exponent (e) (e.g., determined in accordance with Equation 2 above). The public keys 210 and 212 are transmitted to a remote computing device stored in a public key database associated with the corresponding security device. When the security devices 202 and 204 receive a message 214 to use to generate a signature, after the security devices each independently authenticate the signer, the security devices 202 and 204 use function $f_3$ (as described above) to each independently generate a signature 216 and 218.

To sign a digital document, a composite signature 220 is generated from the first signature ($\sigma_1$) 216 and the second signature ($\sigma_2$) 218. In the illustrated example, the composite signature ($\sigma_C$) 220 is generated with function $f_6$ in accordance with Equation 10 below.

$$\sigma_C = (bn_1\sigma_1 + an_2\sigma_2) \bmod (n_1 n_2) \qquad \text{Equation 10}$$

In Equation 10 above, $n_1$ is the public modulus of the first public key 210 and $n_2$ is the public modulus of the second public key 212. Additionally, the coefficients a and b satisfy $an_1 + bn_2 = 1$. The composite signature ($\sigma_C$) 220 is appended to the digital document.

To verify as signed document, the composite public modulus ($n_C$) of the composite public key 222 is calculated using function $f_5$ in accordance with Equation 11 below. The composite public modulus ($n_c$) of the composite public key 222 is based on the public modulus ($n_1$) of the first public key 210 and the second public modulus ($n_2$) of the second public key 212.

$$n_c = n_1 n_2 \qquad \text{Equation 11}$$

Using the composite public key 222 ($<n_c$, e$>$) and the message 214, the signature ($\sigma_s$) associated with the signed digital document is verified with function $f_4$ (as described above).

FIG. 3 illustrates a secure device 300 implementing a device-side portion of the Comp Key signing scheme of FIG. 2. The security device 300 implements the functions $f_1$, $f_2$, and $f_3$. The security device 300 includes a control interface 302 and a input/output (I/O) interface 304. The control interface 302 receives input from a signer 306 to authenticate the identity of the signer 306 before the security device 300 generates the signature 308. The I/O interface 304 communicates directly or indirectly with a computing device (e.g., the computing device 502 of FIGS. 5 and 6 below) to transmit the signature 308 and the public key 310, and receive the message 312 used to generate the signature 308.

FIG. 4 is a block diagram of electronic components 400 of the secure device of FIG. 3. In the illustrated example, the electronic components 400 include the control interface 302, the I/O interface 304, a processor or controller 402, and memory 404, and a data bus 406 that connects the other electronic components.

The control interface 302 provides a physical interface between the security device 300 and the signer 306. The control interface 302 may include a digital camera (e.g., for image capture, visual command recognition, facial recognition, iris recognition, etc.), a touch screen and/or keyboard (e.g., for input of credentials), an audio input device (e.g., a microphone for voice recognition, etc.), a biometric input device (e.g., a fingerprint scanner, etc.) and/or a biometric sensor (e.g., a pulse oximeter, a pulse sensor, etc.). For example, the control interface 302 may include the touch screen and fingerprint identity sensor of a smart phone. The input from the signer 306 to the control interface 302 is used to authenticate the identity of the signer 206. In some examples, more than one method of identifying and authenticating the signer 306 is included. For example, the signer may need to provide both a fingerprint and a password. In some examples, the control interface 302 may be different between two cooperating security devices 300. For example, one security device 300 may have a camera to perform facial recognition and the other security device 300 may have a fingerprint scanner.

The I/O interface 304 provides an interface to communicate with other devices to transmit the public key 310 and the signature 308 and receive the message 312. The I/O interface 304 includes communication controllers and antenna for one or more for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC); local area wireless network (including IEEE 802.11 a/b/g/n/ac or others), Bluetooth® and Bluetooth® Low Energy, and Wireless Gigabit (IEEE 802.11ad), etc.). The I/O interface 304 directly or indirectly (e.g., via anther security device 300) communicates with an external network. The external network may be a public network, such as the Internet; a private network, such as an intranet; or combinations thereof, and may utilize a variety of networking protocols now available or later developed including, but not limited to, TCP/IP-based networking protocols.

The processor or controller 402 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 404 may be volatile memory, non-volatile memory, unalterable memory, read-only memory, and/or high-capacity storage devices (e.g., hard drives, solid state drives, etc). In some examples, the memory 404 includes multiple kinds of memory, particularly volatile memory and non-volatile memory. Additionally, the memory 404 may include secure memory (sometimes referred to as "cryptomemory") which includes an embedded hardware encryption engine with its own authentication keys to securely store information.

Figure 5:
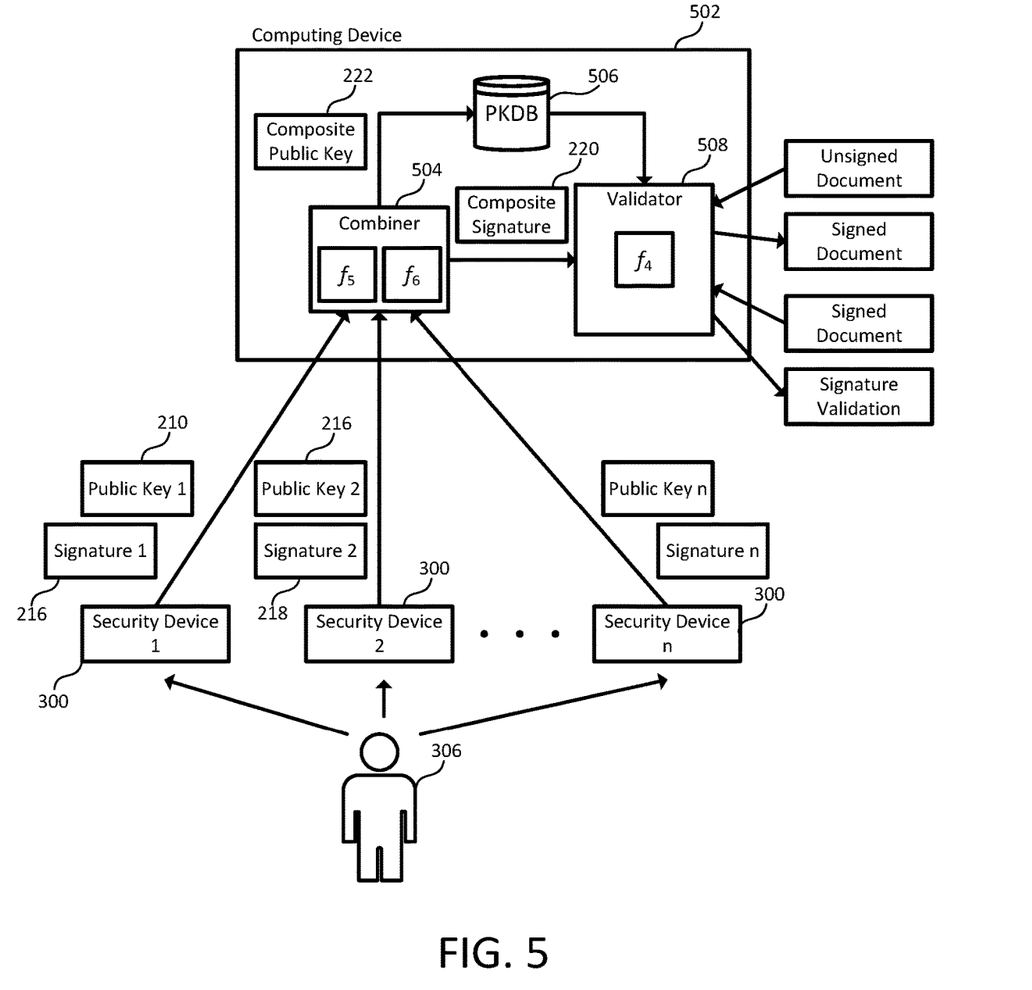
FIGS. 5 and 6 illustrate systems implementing the composite-key asymmetric cryptography of FIG. 2 using multiple secure devices of FIGS. 3 and 4 and a computing device.
Figure 6:
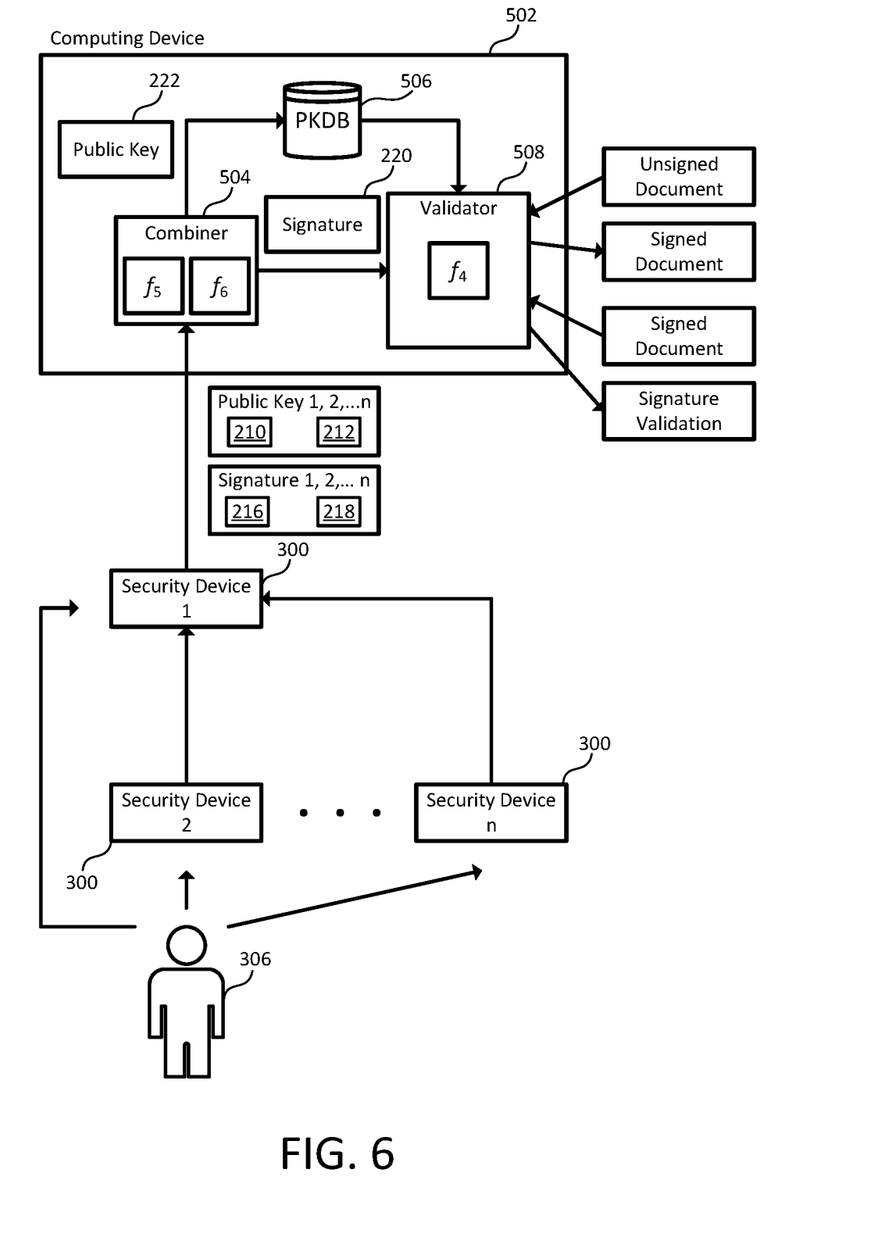

FIGS. 5 and 6 illustrate systems implementing the Comp Key signing scheme of FIG. 2 using multiple security devices 300 of FIGS. 3 and 4 and a computing device 502. In FIG. 5, the security devices 300 communicate directly with the computing device 502. In FIG. 6, one of the security devices 300 communicates directly with the computing device 502 and the other security devices communicate indirectly with the computing device 502 via the directly connected security device 300. In the illustrated examples of FIGS. 5 and 6, (a) the security devices 300 are co-located and accessible to the signer 306, and (b) the computing device 502 is remote (e.g., is geographically removed from and is communicatively coupled to the security devices via an external network, such as the Internet). As described in FIG. 3 above, the security devices 300 implement functions $f_1$, $f_2$, and $f_3$. As illustrated in FIGS. 5 and 6, the computing device 502 implements functions $f_4$, $f_5$, and $f_6$.

As an initial setup, the security devices 300 use function $f$ to independently generate their respective private keys (e.g. the private keys 206 and 208 of FIG. 2 above) and function $f_2$ to generate their respective public keys 210 and 212. The public keys 210 and 212 are transmitted, via the I/O interface 304, to the computing device 502. A combiner 504 within the computing device 502 implements the function $f_5$ to combine the public keys 210 and 212 into a composite public key 222 and stored composite public key 222 in association with identifiers associated with the security devices 300 in a public key database (PKDB) 506. Alternatively, in some example, the computing device stores the public keys 210 and 212 with identifiers associated with the security devices 300 and performs function $f_5$ when the composite public key 222 is needed.

When a digital document is to be signed, the computing device 502 sends a message (e.g., the message 214 of FIG. 2 above) to the security devices 300. The message may be an original message (e.g., the digital document to be signed) or a message digest computed from the original message by applying a cryptographic hash function (e.g., SHA-256, etc.) to the original message. Using the message and their respective private keys 206 and 208, the security devices 300 each generate a signature (e.g., the signatures 216 and 216 of FIG. 2 above) using function $f_3$. The security devices 300 transmit the signatures 216 and 218 to the computing device 502. The combiner 508 implements function $f_6$ to combine the signatures 216 and 218 into a composite signature 220. The message and the composite signature 220 are appended to the document to be signed.

In the illustrated examples of FIGS. 5 and 6, the combiner 504 and the validator 508 represent different security perimeters within the computing device 502 that are executed on different controllers or processors. Alternatively, in some examples, the combiner 504 and the validator 508 may be executing within the same security perimeter within the computing device 502.

When a signed digital document is to be verified, a validator 506 within the computing device 502 implements function $f_4$ with the composite public key 510, the message, and the composite signature 220 appended to the digital document.

Figure 7:
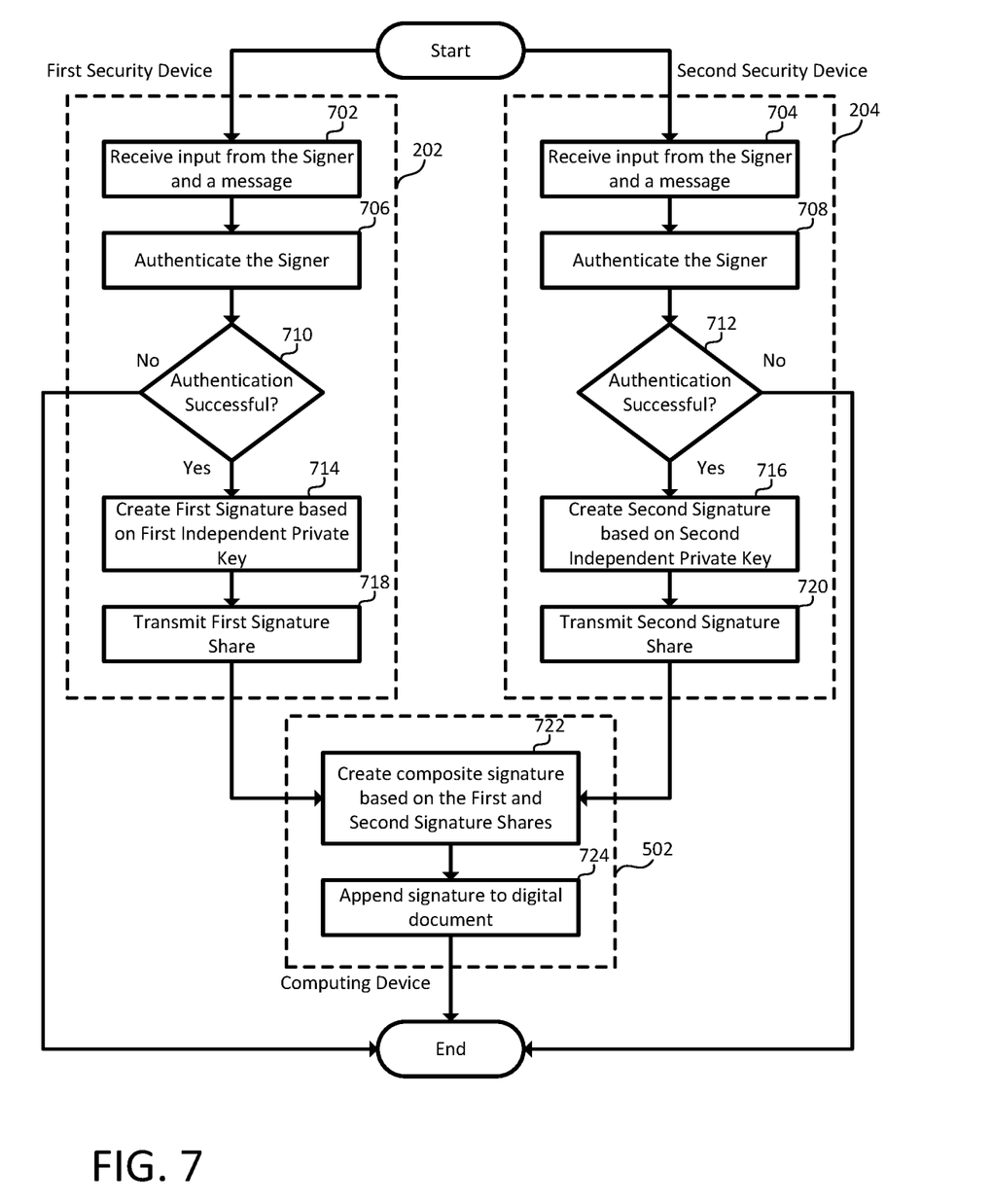
FIG. 7 is a flowchart of a method to sign a document using the composite-key asymmetric cryptography of FIG. 2, which may be implemented by the secure devices of FIGS. 3, 4, 5 and 6 and the computing device of FIGS. 5 and 6.

FIG. 7 is a flowchart of a method to sign a digital document using the composite-key asymmetric cryptography of FIG. 2, which may be implemented by the secure devices 300 of FIGS. 3, 4, 5 and 6 and the computing device 502 of FIGS. 5 and 6. The method may be perform when, for example, the computing device 502 receives a request to sign a digital document. Initially, at block 702, a first security device (e.g., a security device 300 of FIGS. 3 and 4 above) receives an input (e.g., via the control interface 302) from the signer 306 and a message (e.g., via the I/O interface 304). The input is used to authenticate the identity of the signer 306. For example, the input may be a fingerprint or a password. At block 704, a second security device (e.g., a security device 300 of FIGS. 3 and 4 above) receives an input (e.g., via the control interface 302) from the signer 306 and a message (e.g., via the I/O interface 304). At block 706, the first security device uses the input to authenticate the signer 306. At block 708, the second security device uses the input to authenticate the signer 306. At block 710, the method ends when the authentication is not successful. Otherwise, the method continues to bock 714. At block 712, the method ends when the authentication is not successful. Otherwise, the method continues to bock 716.

At block 714, the first security device computes a first signature based on its independent private key. At block 716, the first security device computes a second signature based on its independent private key. At block 718, the first security device transmits the first signature to the computing device 502. At block 720, the second security device transmits the second signature to the computing device 502. At block 722, the computing device generates a composite signature using the first and second signatures. At block 724, the computing device 502 appends the composite signature to the digital document.

In this application, the use of disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A system for generating a digital signature comprising:
a computing device configured to receive a request for a digital signature and to communicate a message to each of a first security and a second security device,
wherein the first security device associated with a signer configured to generate and store a first private key and, in response to receiving the message, generate a first signature based on the message and the first private key;
wherein the second security device associated with the signer configured to generate and store a second private key, the second private key being generated independently from the first private key and, in response to receiving the message, generate a second signature based on the message and the second private key; and
wherein the computing device is remote from the first security device and the second security device, and wherein the computing device is configured to:
after communicating the message and responsive to receiving the independently generated first and second signatures, generate a composite cryptographic signature based on the first signature and the second signature; and
append the composite cryptographic signature to a digital document comprising the message or a message digest.

2. The system of claim 1, wherein:
the first security device is additionally configured to, before generating the first signature, authenticate the signer based on a first input to the first security device; and
the second security device is additionally configured to, before generating the second signature, authenticate the signer based on a second input to the second security device.

3. The system of claim 2, wherein the first input is a different type of input than the second input.

4. The system of claim 1, wherein:
the first security device is additionally configured to generate the first private key and a first public key including a first public modulus; and
the second security device is additionally configured to generate the second private key and a second public key including a second public modulus.

5. The system of claim 4, wherein the computing device is configured to generate the composite cryptographic signature further based on the first public modulus and the second public modulus.

6. The system of claim 1, wherein the computing device does not store a private key used to generate the composite cryptographic signature.

7. The system of claim 1, wherein the first security device and the second security device are communicatively coupled to the computing device, and where the first security device is configured to transmit the first signature to the computing device and the second security device is configured to transmit the second signature to the computing device.

8. The system of claim 1, wherein the first security device is communicatively coupled to the computer device, and the second security device is communicatively coupled to the first security device, and where the second security device is configured to transmit the second signature to the first security device and the first security device is configured to transmit the first and second signatures to the computing device.

9. A method to generate a digital signature comprising:
by a first security device associated with a signer:
generating and storing a first private key;
in response to receiving a message, generating a first signature based on the message and the first private key;
by a second security device associated with the signer:
generating and storing a second private key, the second key being generated independently of the first private key;
in response to receiving the message, generating a second signature based on the message and the second private key;
by a computing device remote from the first security device and the second security device:
responsive to receiving a request for the digital signature, sending the message to the first security device and the second security device;
after communicating the message and responsive to receiving the independently generated first and second signatures, generating a composite cryptographic signature based on the first signature and the second signature; and
appending the composite cryptographic signature to a digital document comprising the message or a message digest.

10. The method of claim 9, wherein:
before generating the first signature, authenticating, by the first security device, the signer based on a first input to the first security device; and
before generating the second signature, authenticating, by the second security device, the signer based on a second input to the second security device.

11. The method of claim 10, wherein the first input is a different type of input than the second input.

12. The method of claim 9, further including:
generating, by a the first security device, a first public key including a first public modulus; and
generating, by the second security device, a second public key including a second public modulus.

13. The method of claim 12, further including generating, by the computing device, the composite cryptographic signature further based on the first public modulus and the second public modulus.

14. The method of claim 9, wherein the computing device does not store a private key used to generate the composite cryptographic signature.

15. The method of claim 9, wherein the first security device and the second security device are each communicatively coupled to the computing device.

* * * * *